May 16, 1950 — H. B. COLE — 2,507,771
DIAGNOSTIC INSTRUMENT
Filed Jan. 11, 1946 — 3 Sheets-Sheet 1
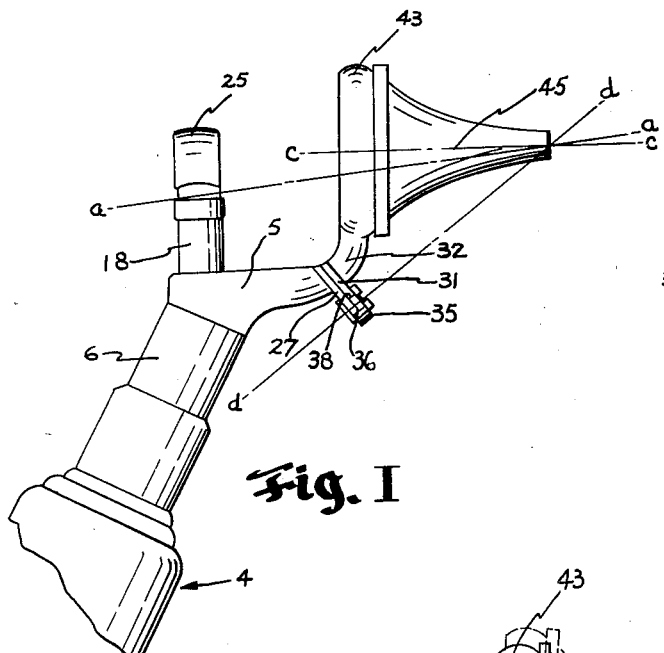
Fig. I
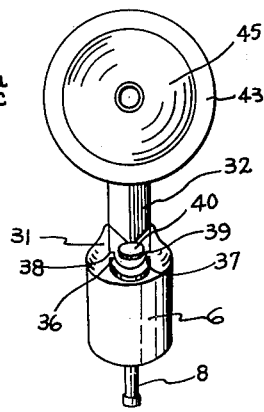
Fig. II
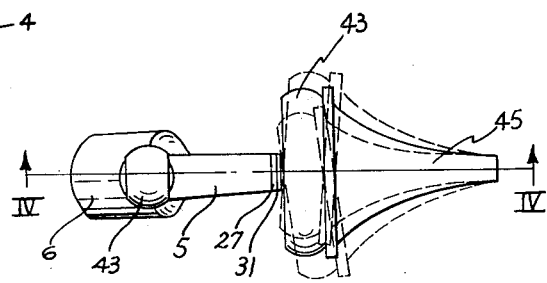
Fig. III
INVENTOR
HENRY B. COLE
BY
Louis L. Gagnon
ATTORNEY

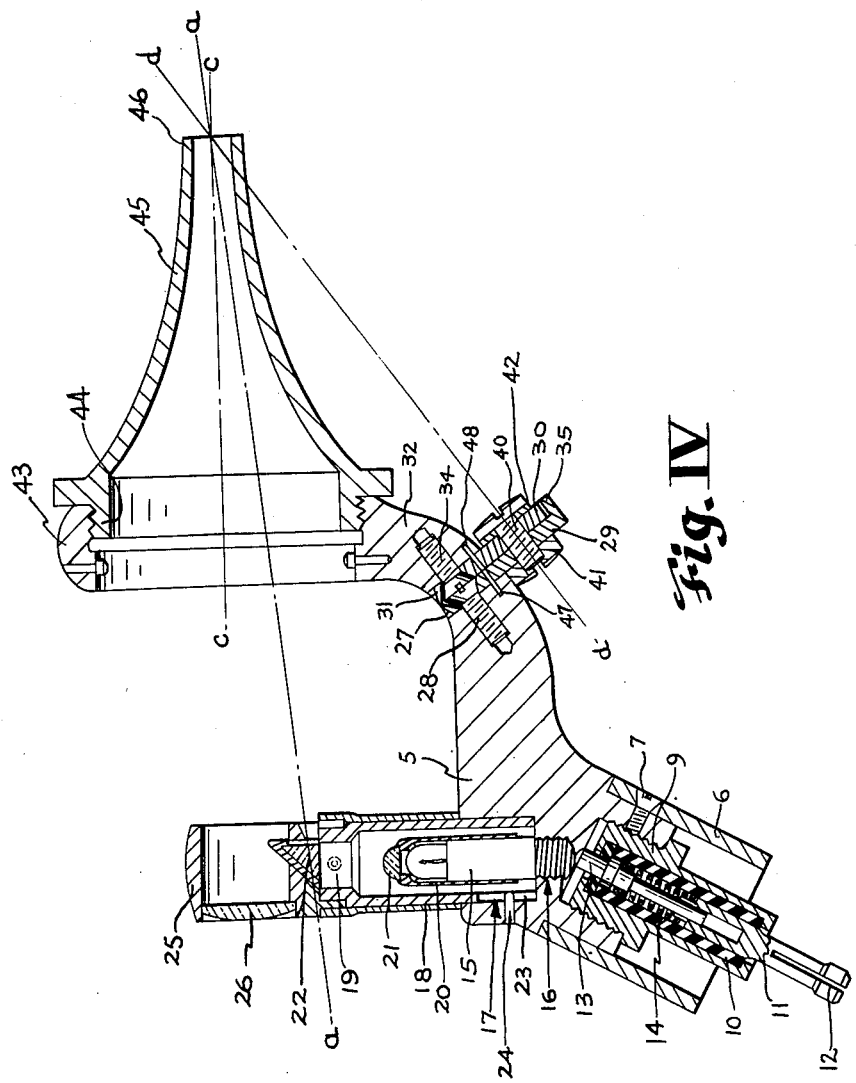

May 16, 1950  H. B. COLE  2,507,771
DIAGNOSTIC INSTRUMENT
Filed Jan. 11, 1946  3 Sheets-Sheet 3
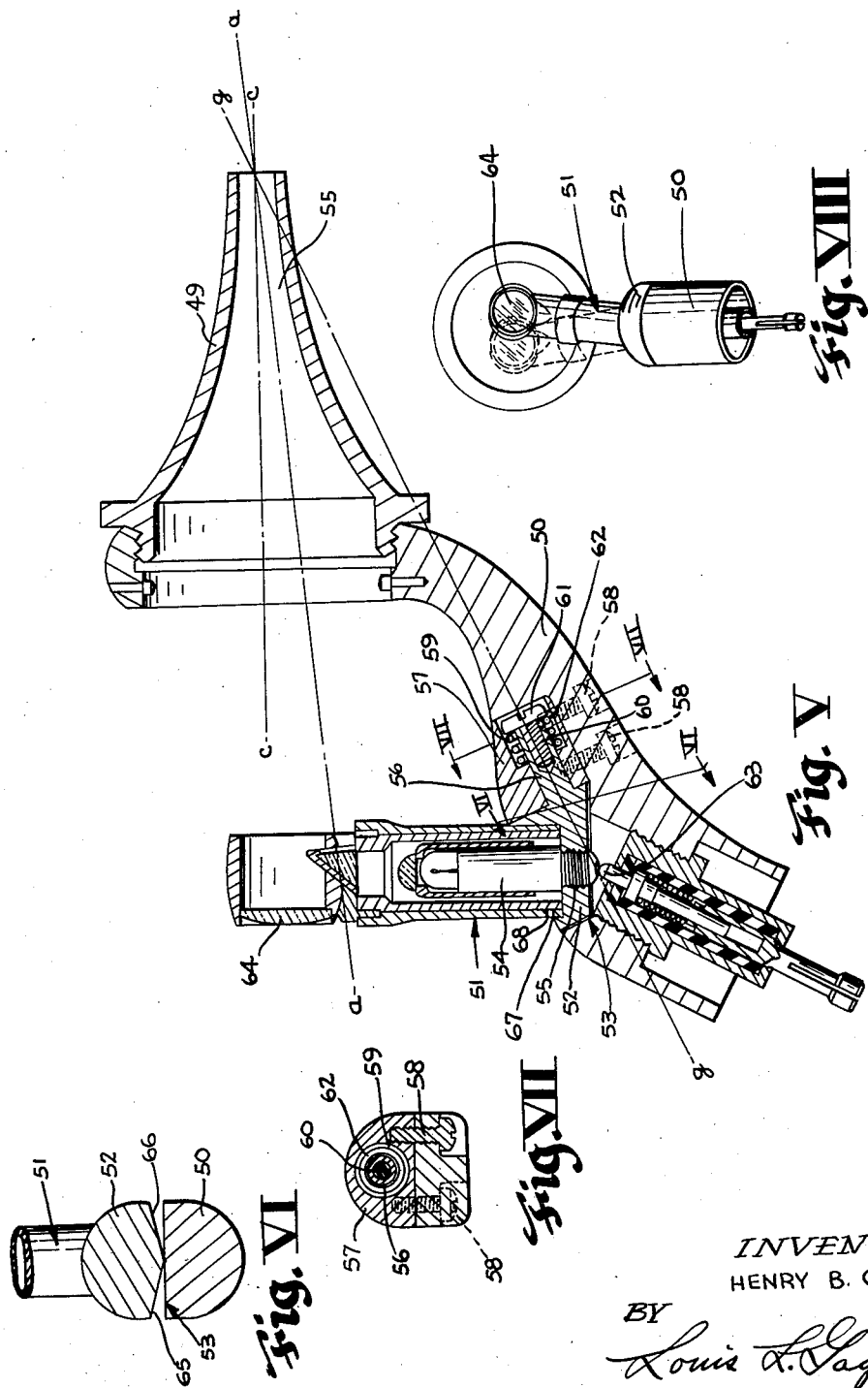
INVENTOR
HENRY B. COLE
BY
Louis L. Gagnon
ATTORNEY Patented May 16, 1950

2,507,771

UNITED STATES PATENT OFFICE 2,507,771

DIAGNOSTIC INSTRUMENT

Henry B. Cole, Southbridge, Mass., assignor to American Optical Company, Southbridge, Mass., a voluntary association of Massachusetts Application January 11, 1946, Serial No. 640,455

5 Claims. (Cl. 128—9)

This invention relates to improvements in diagnostic instruments and has particularly reference to an instrument of the type embodying means for aiding in gaining access to a source to be examined or treated and having self-contained illuminating means for illuminating said source.

One of the principal objects of the invention is to provide a simple, efficient and inexpensive instrument of the above character whereby the angle axis of the means for gaining access to the source to be observed or treated and the direction of the beam from the source of illumination may be altered while retaining the focus of the illumination at said source whereby relatively free manipulation of surgical instruments is afforded with substantially no altering of the intensity of illumination of said source.

Another object is to provide an instrument of the above character having a speculum and a source of illumination so arranged that said source of illumination and said speculum may be adjusted relative to each other within a limited arc having its effective center located adjacent the end of the speculum whereby the light rays will retain a substantially constant focus on an object field at said end of the speculum.

Another object is to provide an instrument of the above character whereby the axis of the speculum and the direction of projection of the light are adjustable relative to each other in such a manner that the mouth of the speculum moves in an arcuate path about an axis defined by a line extending from a point exteriorly of the speculum and intersecting the axis of the speculum adjacent the center of the smaller end thereof.

Another object is to provide an instrument of the above character having its light projecting member and speculum supporting member pivotally adjustable relative to each other with the longitudinal axis of the pivot intersecting the axis of the speculum substantially at the center of the small end thereof.

Still another object is to provide means in an instrument of the above character whereby the light projecting member and the speculum are adjustable relative to each other about an axis forming an acute angle with the light rays projected through the small end of the speculum.

A further object is to provide an instrument of the character described wherein the light projecting member embodies a field magnifier and the speculum member are rotatable relative to said light projecting member and magnifier about an axis intersecting the axis of the projected light rays substantially along the axis of the speculum at the small end thereof.

Still another object is to provide an otoscope or the like with a speculum adjustable relative to the light projecting member wherein the small end of the speculum will always act as the focal point of the projected light through all adjusted positions of the speculum.

Other objects and advantages of the invention will become and be apparent from the following description taken in connection with the accompanying drawings and it will be understood that many changes may be made both in the details of construction and arrangement of parts shown and described without departing from the spirit of my invention as set forth in the accompanying claims. I, therefore, do not wish to be limited to the exact arrangement of parts and details shown and described. The preferred forms have therefore been shown only by way of illustration and not in a limiting sense.

Referring to the drawings:

Fig. I is a perspective view of a device embodying the invention in side elevation;

Fig. II is a front view of the device;

Fig. III is a top perspective view;

Fig. IV is an enlarged sectional view of the device taken along line IV—IV of Fig. III;

Fig. V is a view generally similar to Fig. IV showing a modification of the invention;

Fig. VI is a cross sectional view in fragmentation taken on line VI—VI of Fig. V and looking in the direction indicated by the arrows;

Fig. VII is another fragmentary cross sectional view taken along line VII—VII of Fig. V and looking in the direction indicated by the arrows; and Fig. VIII is a rear view of said modification.

In attempting to perform surgical operations through the speculum of an otoscope which has become a very desirable practice of late years, there has been encountered a major obstacle to the full success thereof. Where the light projector and field magnifier embodied in such injector and field magnifier embodied in such instruments have been positioned rearwardly of the speculum, good illumination of the objective field has been possible for diagnostic purposes, but the projector and magnifier have provided a certain amount of interference with the free manipulation of the surgical instruments in the speculum entrance when surgical treatment has been necessary. Various attempts have been made to remedy this situation by offsetting the light projector to one side or the other of the axis of the speculum, depending upon whether the operator is right or left handed. Although this has provided more room for the free manipulation of instruments, it almost invariably has resulted in diminished illumination of the objective field or has resulted in a cumbersome structure.

The present invention overcomes the above difficulties by employing novel, readily adjustable, compact means in an otoscope construction whereby successfully delicate operations may be performed through the speculum thereof without sacrificing either the illumination for freer manipulation of the instruments or vice versa as was necessary in most prior art instruments. Applicant has devised simple, efficient and readily adjustable means in his instrument whereby the light projecting member and speculum are rotatable or adjustable relative to each other about a common pivot whose axis of rotation is at an acute angle to and will always intersect the axis of the beam of light substantially at or forwardly of the center of the small end of the speculum. Thus, through any adjusted position of the light projector, or for that matter conversely, the speculum, there will always be constant undiminished illumination of the objective field. Consequently, in performing examinations through the speculum, the light projector may be located at the center of the speculum and, during surgical operations, may be adjusted to one side or the other to permit the free and unhampered manipulation of the necessary surgical instruments through the entrance of the speculum, and still provide a full flood of light upon the objective field.

Referring more particularly to the drawings wherein like characters of reference designate like parts throughout the several views, in Figs. I through IV, the device embodying the invention comprises a support 5 having a sleeve 6 secured thereto by a screw or the like 7. The sleeve 6 functions as a connecting member for securing the support 5 to the handle 4 in the usual conventional manner. Within the sleeve 6, there is threadedly connected to the support 5 a member 9 having a hollow bore in which is mounted a bushing 10 of insulating material. Internally of the bushing 10 there is rotatably mounted a conductor 11 having a slotted end 12 adapted to frictionally engage with one pole of a source of electrical energy such as a battery carried within the handle 4 or an adaptor in said handle which is in turn connected with an electrical source in the conventional manner. The conductor 11 is telescopically associated with a contact member 13 which is resiliently urged in a direction outwardly of the upper end of the member 9 by a coil spring or the like 14. The contact member 13 is adapted to engage the central pole of an electric lamp or bulb 15 which is threadedly connected to the support as illustrated at 16. The bulk 15 lies within a hollow bore 17 in said support 5 and in which is frictionally held a housing 18. The housing 18 is provided, adjacent the upper end thereof, with a light passageway 19 through which light from the bulb 17 is adapted to pass. The bulb 15 is provided with a tubular cap 20 having a suitable condensing or focusing lens 21 adjacent the upper end thereof. Mounted in alignment with the light passageway 19 there is provided a suitable reflector 22 which may be in the form of a mirror, prism or other suitable light deflecting means. The housing 18 is provided with a longitudinal slot 23 adapted to interfit with a pin 24 carried by the main support 5 for holding the housing against rotation. Mounted on the upper end of the housing 18 there is a casing 25 having a magnifier 26 mounted therein. The longitudinal axis of the casing and the axis of the magnifier is in substantially normal relation with the longitudinal axis of the housing 18. The light from the bulb 15 is adapted to be directed through the light passageway 19 and to be reflected by the light deflecting means 22 in a direction indicated by the line $a-a$ which is indicative of the axis of the projected beam of light. The support 5, adjacent the forward end thereof, is provided with a plate 27 connected with said support as by a screw, pin or the like 28. The said plate 27 has a depending portion 29 pivotally connected to a similar depending portion 30 of a similar plate-like member 31 connected with a speculum support 32 as by a screw, pin or the like 34. The plate 27 is provided with a raised lip-like portion 35 adapted to surround the lower end of the depending portion 30 with the said lip 35, as shown in Figs. I and II, having upper shouldered edges 36 and 37 which are adapted to be engaged by similar shouldered portions 38 and 39 formed on the depending portion 30 for limiting movement of said plate-like portions 27 and 31 relative to each other about the axis of the pivot screw 40 which pivotally connects said depending portions. The pivot screw 40 is provided with a nut 41 and with a spring washer 42 for retaining said pivot screw against loosening.

The speculum support 32 is provided with an integral ring-like portion 43 having a portion of its inner circumferential surface threaded to receive the threaded end 44 of a speculum 45. The speculum 45 is provided with a reduced end portion 46 through which the beam of light is adapted to be directed by the light deflecting means 22 with the axis $a-a$ of the beam extending substantially through the center of the reduced ends 46 of the speculum. The longitudinal axis $c-c$ of the speculum is substantially coaxial with the longitudinal axis of the sight opening in the casing 24 and the magnifying lens 26 carried thereby.

It is further particularly pointed out that the longitudinal axis $d-d$ of the pivot screw 40 extends through and intersects the axis of the beam of light $a-a$ and the longitudinal axis of the speculum $c-c$ substantially centrally of and in the plane of the smaller end 46 of the speculum. If desired, however, the axis $d-d$ may intersect the axis $a-a$ of the light beam slightly forwardly of the plane of the small end of the speculum. By referring to Figs II and III, it is to be noted that the speculum 45 and its support may be swung about the pivot screw or the like 40 in a direction one side or the other of the axis $a-a$ of the deflected beam of light with the extent of movement in either direction being limited by the interengaging shouldered portions 36, 37, 38 and 39 which function as stop means for controlling the final amount of offset of the speculum relative to the axis $a-a$. Due to the fact that the axis $d-d$ of the pivot intersects the axis $a-a$ substantially centrally of and in the plane of the end of the small end of the speculum, the light rays will always be directed toward said small end thus insuring perfect illumination of the object field in all adjusted positions. In this manner, surgical instruments may be readily inserted and magnified internally with the light beam showing full illumination of the area or object field being treated.

The friction washer or the like 42 tends to retain the speculum in desired adjusted position relative to the axis of the pivot screw 40. If desired, the plates 27 and 31 and the adjacent ends of the main support 5 and speculum support 32 may be interconnected by suitable pins 47 and 48 for holding the plates 27 and 31 against movement about the centers of the connecting screws 28 and 34.

While it has been described above that one pole of the source of electrical energy is directed through the conductor 11, the other pole is directed through the sleeve 6, the support 5 and outer threaded portions 16 of the bulb. This is in accordance with the usual practice.

In this particular construction, the housing 18 while readily removable from the main support 5 is held against rotary movement with respect to said support 5 by the pin 24 and longitudinal slot 23. In Figs. V through VIII, there is shown a modified form of the invention wherein the speculum 49 is rigidly supported by the main support 50 simulating the support 5. The details of construction of the support 50, attachments of the speculum and instrument head attachment with the handle together with the electrical conducting system are similar to the arrangement set forth in Figs. I through IV.

In the present construction, however, the lamp housing 51 is carried by a base support 52 shaped to fit and to lie within a recessed area 53 formed in the main support 50. In this instance, the lamp or bulb 54 is threadedly connected to the base support 52, as illustrated at 55. The said base support 52 is provided with a pivot projection 56 which is pivotally supported internally of a pivot block 57 secured in said recess which is secured in the recessed portion 53 by means of the screw members 58.

The pivot block 57 is provided with a hollow bore 59 into which the outer end of the pivot projection extends. This end of the pivot projection is provided with a threaded bore adapted to receive a screw 60 having an enlarged head 61. Between said enlarged head 61 and the base of the hollow bore 59, there is positioned a coil spring 62 for introducing a frictional pivotal movement of the housing 51 relative to the main support 50 and speculum 49.

It is particularly pointed out that in this instance, the bulb or lamp support 54 together with the prism and housing 51 and field magnifier 64 carried by the housing are pivotally adjustable relative to the main support and speculum about a longitudinal pivotal axis g—g which pivotal axis intersects the longitudinal axis of the speculum c—c and the axis of the deflected beam of light substantially in the center and in the plane of the small end of the speculum in a manner generally similar to that of the construction of Figs. I through IV, the main difference, however, being that the longitudinal axis g—g of the pivot connection also intersects the point of contact of the base 55 of the light bulb with the end 63 of the central conductor.

The base support 52 is provided with angled undersurfaces 65 and 66 to provide clearance for the angling of the housing 51, as illustrated in Figs. VI and VIII, to shift the housing from one side to the other of the longitudinal axis c—c of the speculum.

During this shifting of the housing to one side or the other of the longitudinal axis c—c of the speculum, the said housing will tilt about the axis g—g and due to the fact that the axis g—g intersects the axis a—a of the deflected beam of light substantially at the center and in the plane of the speculum, or slightly forwardly thereof, if desired, the light beam will always be directed directly through the end of the speculum for full field illumination.

Due to the fact that the central contact 63 with the bulb support or base 55 is along line g—g, the point of contact of said parts will not shift.

The lamp housing 51 is frictionally fitted within a recess in the base support 52 in a manner generally similar to the construction of Fig. IV. The base support in this instance, however, is provided with a tongue 67 adapted to fit within a slot 68 when the housing is being located in position of use and is adapted to hold said housing in position relative to the base support 52.

From the foregoing description, it will be seen that the constructions of Fig. I through IV and V through VIII function in a generally similar manner and that all of the objects and advantages of the invention are attained.

Having described my invention, I claim:

1. In a diagnostic instrument of the character described, a head comprising a pair of supporting members having a pivot portion about which said members are assembled for relative rotational movement, one of said supporting members supporting an upright portion and light projecting means carried by the upright portion, and the other member supporting a cone-shaped speculum, said speculum having its longitudinal axis disposed substantially normal to the longitudinal axis of the upright portion, with its larger end toward the light projecting means and its opposed end shaped for insertion in a cavity of the body, said light projecting means being adapted to project a beam of light through said larger end of the speculum to intersect the longitudinal axis of the speculum adjacent its opposed end, and with the axis of said pivot portion intersecting the longitudinal axis of the upright portion at a point below the light projecting means and substantially intersecting said point of intersection of said projectable beam of light with the longitudinal axis of the speculum whereby said upright portion and light projecting means carried thereby may be swung transversely of the longitudinal axis of the speculum along a path of compound curvature effectively defined by said two points of intersection of the pivotal axis to permit access to the larger end of the speculum without disturbing the projection of light to its opposed end.

2. In a diagnostic instrument of the character described, a pair of supporting members having a pivot portion about which said members are assembled for relative rotational movement, one of said supporting members including an upright portion and light projecting means carried by said upright portion, and the other member supporting an entrant member having an end portion for insertion in a cavity of the body, said light projecting means being adapted to project a beam of light to said end portion of the entrant member and with the axis of said pivot portion intersecting the longitudinal axis of the upright portion at a point below the light projecting means and intersecting said projected beam of light adjacent said end portion of the entrant member whereby said light projecting means and said member supporting the entrant member may be displaced laterally relative to each other along an arcuate path whose center is defined by the axis of the pivot portion while retaining the projection of light to said end of the entrant member.

3. In a diagnostic instrument of the character described, a pair of spaced upright supporting members, one of said members carrying light projecting means and the other member carrying a cone-shaped speculum, said speculum having its longitudinal axis disposed substantially normally to the vertical axes of said spaced upright supporting members, with its larger end toward the light projecting means and its opposed end shaped for insertion in a cavity of the body, said light projecting means being adapted to project a beam of light through said larger end of the speculum to intersect the longitudinal axis of the speculum adjacent the opposed end thereof, and said spaced upright supporting members each having a plane surface portion for sliding engagement with an adjacent plane surface portion of the other member, said plane surface portions being disposed in offset relation to said vertical axes of the upright supporting means and pivot means connecting said plane surface portions for relative rotational movement, the axis of said pivot means being disposed relative to the vertical axes of said upright supporting members as to intersect said vertical axes at points below the projectable beam of light and to substantially pass through said point of intersection of the beam of light with the longitudinal axis of the speculum whereby said upright supporting members may be swung about said axis relative to each other and in directions transversely of the direction of said projectable beam of light to permit access to the larger end of the speculum without disturbing the projection of light to the opposed end.

4. In a diagnostic instrument of the character described, a head comprising a supporting member having a recessed portion therein and a second supporting member having a pivot portion seated in said recessed portion to permit relative rotational movement of said supporting members, said second supporting member having an upright portion and light projecting means carried by the upright portion, and the first supporting member having a cone-shaped speculum supported thereon, said speculum having its longitudinal axis disposed substantially normal to the longitudinal axis of the upright portion, with its larger end toward the light projecting means and its opposed end shaped for insertion in a cavity of the body, said light projecting means being adapted to project a beam of light through said larger end of the speculum to intersect the longitudinal axis of the speculum adjacent its opposed end, said pivot portion of the second supporting member seated in the recessed portion of the first supporting member being so angled relative to the upright portion that its axis of movement substantially intersects both the longitudinal axis of the upright portion at a point below the light projecting means and said projectable beam of light substantially at its point of intersection with the longitudinal axis of the speculum whereby said upright portion and light projecting means carried thereby may be swung transversely of the longitudinal axis of the speculum along a path of compound curvature effectively defined by said two points of intersection of the pivotal axis to permit access to the larger end of the speculum without disturbing the projection of light to its opposed end.

5. In a diagnostic instrument of the character described, a head comprising a pair of supporting members one having a recessed portion therein and a rotatable portion mounted in said recessed portion to which the second supporting member is secured to permit relative rotational movement of said supporting members, said second supporting member comprising an upright portion having light projecting means supported thereon, and said first supporting member having a cone-shaped speculum supported thereon, said speculum having its larger end disposed toward the light projecting means and its opposed end shaped for insertion in a cavity of the body, said light projecting means being adapted to project a beam of light through said larger end of the speculum to intersect the longitudinal axis of the speculum adjacent its opposed end, with the axis about which said rotatable portion rotates passing substantially centrally of said rotatable portion and so as to substantially intersect both the longitudinal axis of the upright supporting member at a point below the light projecting means and said projectable beam of light substantially at its point of intersection with the longitudinal axis of the speculum whereby said second supporting member and light projecting means carried thereby may be swung transversely of the longitudinal axis of the speculum along a path of compound curvature effectively defined by said two points of intersection of the pivotal axis to permit access to the larger end of the speculum without disturbing the projection of light to its opposed end.

HENRY B. COLE.

REFERENCES CITED

The following references are of record in the file of this patent:

UNITED STATES PATENTS

| Number | Name | Date |
| --- | --- | --- |
| 2,184,414 | Dittmer | Dec. 26, 1939 |
| 2,290,665 | Arnesen | July 21, 1942 |